United States Patent
O'Hara

(10) Patent No.: US 9,628,510 B2
(45) Date of Patent: Apr. 18, 2017

(54) SYSTEM AND METHOD FOR PROVIDING DATA STORAGE REDUNDANCY FOR A PROTECTED NETWORK

(71) Applicant: Arbor Networks, Inc., Burlington, MA (US)

(72) Inventor: Sean O'Hara, Ypsilanti, MI (US)

(73) Assignee: Arbor Networks, Inc., Burlington, MA (US)

( * ) Notice: Subject to any disclaimer, the term of this patent is extended or adjusted under 35 U.S.C. 154(b) by 69 days.

(21) Appl. No.: 14/710,270

(22) Filed: May 12, 2015

(65) Prior Publication Data
US 2016/0337396 A1    Nov. 17, 2016

(51) Int. Cl.
*H04L 29/06* (2006.01)
*H04L 12/26* (2006.01)

(52) U.S. Cl.
CPC ...... *H04L 63/1458* (2013.01); *H04L 63/1416* (2013.01); *H04L 43/10* (2013.01)

(58) Field of Classification Search
CPC ..... H04L 43/10; H04L 43/0811; H04L 41/28; G06F 11/2023; G06F 11/2033; G06F 17/30575
USPC .......................................................... 726/23
See application file for complete search history.

(56) References Cited

U.S. PATENT DOCUMENTS

| | | | | |
|---|---|---|---|---|
| 7,076,555 B1* | 7/2006 | Orman | .................. | G06F 11/203 370/216 |
| 2002/0013898 A1* | 1/2002 | Sudia | .................... | G06Q 20/02 713/155 |
| 2003/0237016 A1* | 12/2003 | Johnson | ................. | G06Q 10/10 714/4.1 |
| 2008/0288607 A1* | 11/2008 | Muchow | ............. | G06F 9/44505 709/209 |
| 2011/0038633 A1* | 2/2011 | DeCusatis | ............. | H04L 41/064 398/79 |
| 2011/0047230 A1* | 2/2011 | McGee | ............... | H04L 41/0609 709/206 |
| 2011/0051932 A1* | 3/2011 | Hoover | ................... | H04L 41/28 380/270 |
| 2013/0055374 A1* | 2/2013 | Kustarz | ............... | H04L 63/1408 726/13 |
| 2016/0210209 A1* | 7/2016 | Verkaik | ............... | G06F 11/2033 |

OTHER PUBLICATIONS

Arbor Networks ST V20 Mar. 10, 2014.*

* cited by examiner

*Primary Examiner* — Syed Zaidi
(74) *Attorney, Agent, or Firm* — Locke Lord LLP; Scott D. Wotsy; Christopher J. Capelli

(57) ABSTRACT

A system and method for providing redundancy with remote scrubbing center devices. The system includes an edge detection device and a plurality of scrubbing center devices in a telecommunications network for providing redundant scrubbing center functionality for the edge detection device. The edge detection device maintains a network connection with more than one of the plurality of scrubbing center devices whereby each of the more than one of the plurality of scrubbing center devices sends and receives a synchronization signal with each of the one or more edge detection devices as if it was the only remote scrubbing center device coupled to the edge detection device.

19 Claims, 2 Drawing Sheets

SYSTEM AND METHOD FOR PROVIDING DATA STORAGE REDUNDANCY FOR A PROTECTED NETWORK

FIELD OF THE INVENTION

The present invention relates generally to computer networks, and specifically to methods and systems for providing redundancy of server devices for computer networks protected against denial of service attacks.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks, and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either ½ open TCP connections or fully open idle connections); and Vulnerability Exploit Attacks (e.g., attacks designed to exploit a vulnerability in a victim's operating system).

In view of the above, it is thus advantageous to provide redundancy of external server functionality in the event an Internet coupled "cloud" signaling server goes down. Currently, there are primarily two known solutions for providing client/server redundancy. It is to be appreciated that with regards to both solutions, the client device must have knowledge regarding the redundant server which is to become the current primary server, which has proven disadvantageous for at least the below reasoning. The first known solution provides a fail over to a redundant server at the time of failure whereby the client device determines that communication with the primary server is down so as to initiate a connection with one of the redundant servers. However, an associated disadvantage is the client must be able to perform a handshake with the new primary server which may not be possible if the client is subject to a denial of service attack. The aforesaid second solution is to provide a fail over approach similar to the first solution except encryption keys are propagated from the primary server to associated redundant servers. In accordance with redundancy solution, the client needs to determine that communication with the primary server is down so as to start sending heartbeat protocol signals to the redundant server to establish communication therewith, which again may not be feasible when the client device is subject to a denial of service attack.

The architecture of the Internet makes networks and network devices vulnerable to the growing problems of denial of service (e.g., DDoS) attacks. Therefore, the ability to avoid or mitigate the damages of a DDoS attack, while preventing blocking of valid hosts and viable data storage redundancy is advantageous to devices located in a protected network.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

In accordance with the certain illustrated embodiments described herein, the present invention provides a system and method for providing redundancy with remote scrubbing center devices. The system includes an edge detection device and a plurality of scrubbing center devices in a telecommunications network for providing redundant scrubbing center functionality for the edge detection device. The edge detection device maintains a network connection with more than one of the plurality of scrubbing center devices whereby each of the more than one of the plurality of scrubbing center devices sends and receives a synchronization signal with each of the one or more edge detection devices as if it was the only remote scrubbing center device coupled to the edge detection device. An advantage of the present invention is the edge detection device does not need to initiate a handshake when under attack (which may not be possible) while also significantly simplifying the need to sync all redundant network connected scrubbing center devices when new encryption keys are generated.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
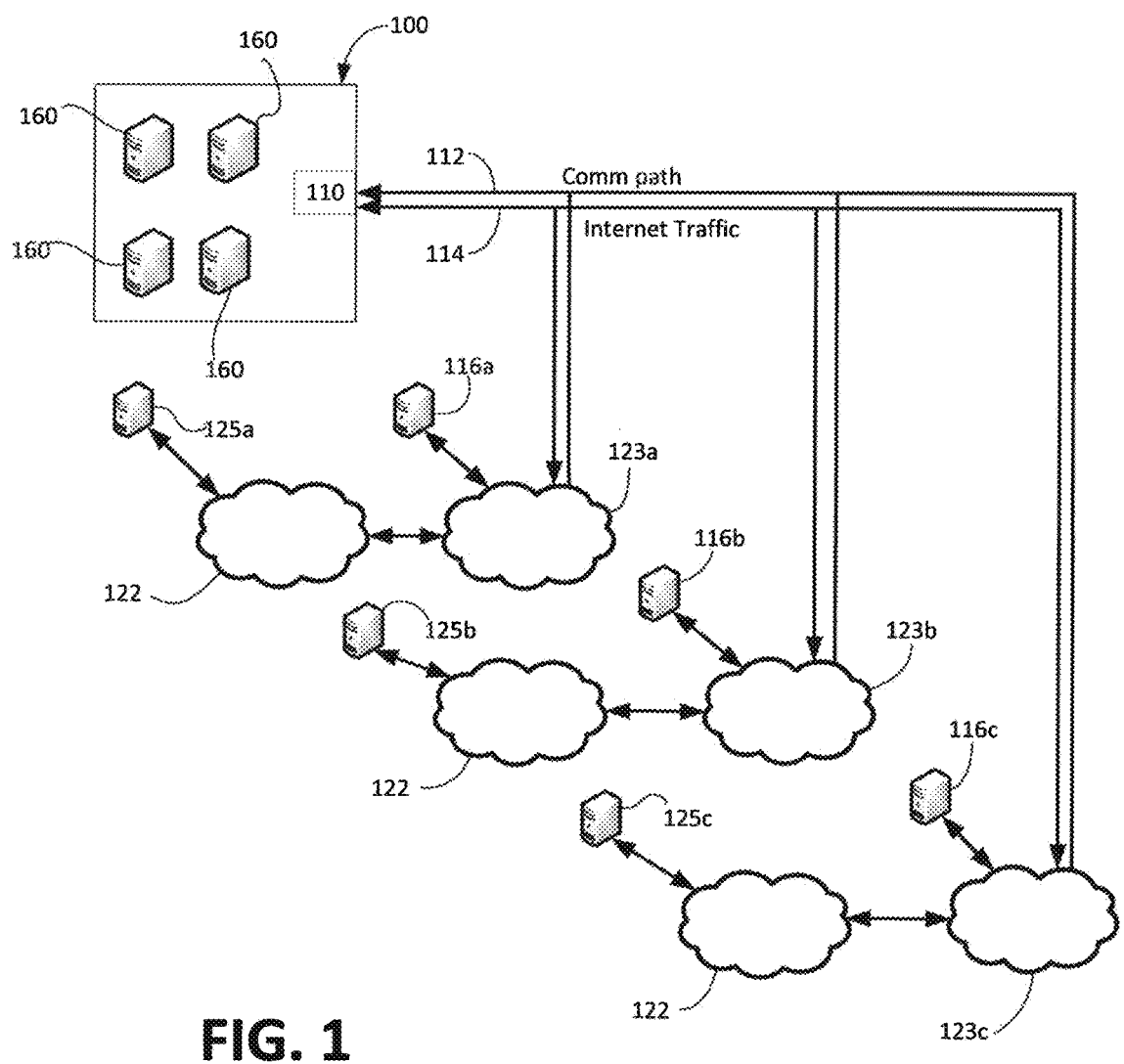
FIG. 1 illustrates an exemplary network communications system, in which an embodiment of the present invention may be implemented.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

It is to be further understood the illustrated embodiments of the present invention describe a system, apparatus and method for avoiding and mitigating the harmful effects of a Distributed Denial of Service ("DDoS") attack on a computer system/device or network. An ordinary denial of service attack, or DoS attack, may be defined as an attack by an offensive external device on a network device such as network routers, Internet servers, electronic mail servers, Domain Name System servers, etc. Such an attack may cause a loss of service to the network users due to a consumption of network bandwidth or an overload of system resources. The DDoS attack is an enhanced DoS attack in which multiple offensive devices coordinate a simultaneous attack upon a single targeted network device.

Turning now descriptively to the drawings, in which similar reference characters denote similar elements throughout the several views, FIG. 1 illustrates the relationship between the protected network 100, protection system 110, a telecommunications System/Network (e.g., the Internet) 122, and external server devices, each preferably configured and adapted to provide redundancy of server functionality for one or more protected client devices 160. It is to be appreciated that for ease of description, the telecommunications network is described as the Internet 122 for below illustrated embodiments, but it is not to be understood to be limited thereto as a telecommunications network is to be understood to be a collection of terminal nodes, links and any intermediate nodes which are connected so as to enable telecommunication between the terminals.

With reference now to FIG. 1, illustrated is an exemplary embodiment of a network architecture to which the present invention is applicable. In particular, illustrated is the relationship between the internet 122, internet service provider (ISP) network 123, scrubbing center 116, edge detection device/protection system 110, and a protected network 100. For ease of illustration purposes, edge detection device 110 is shown coupled to three (3) ISP's 116a-116c, however, it is to be appreciated the present invention may be coupled to any desirable number of ISP's 116 in accordance with the teachings set forth herein.

In accordance with an illustrated embodiment, the edge detection device 110 is configured to authenticate external server devices before allowing external server devices to access the protected devices 160 within the protected network 100. For instance, an illustrated use of the protection system 110 described herein is with the PRAVAIL™ Availability Protection System (PRAVAIL™ APS) from Arbor® Networks. PRAVAIL™ APS is a network security product configured and adapted for generally preventing DDoS attacks and availability threats that affect data centers and enterprise networks. PRAVAIL™ APS may be deployed by network/data center operators in front of services to stop application-layer attacks and disrupt botnet communications. PRAVAIL™ APS may further be integrated upstream in a network/date center to preferably stop thwart volumetric DDoS attacks. Features of PRAVAIL™ APS include (but are not limited to): detecting and blocking emerging application-layer DDoS attacks; deploy a turnkey solution to thwart DDoS threats; accelerate responses to DDoS attacks to prevent disruption of legitimate services; and prevent illegitimate botnet communications by leveraging real-time security intelligence.

During an attack, such as a Denial of Service (DoS) or Distributed Denial of Service (DDoS) attack, the edge detection/protection system 110 seeks to distinguish between attack traffic and traffic made by legitimate external devices 116 by analyzing traffic to determine traffic (packet)

classifications which are subsequently used to determine countermeasures (preferably of varying severity to mitigate attack), which are to be applied to received packets in the traffic, prior to accessing the protected devices 160 within the protected network 100. Thus, a goal of the protection system 110 is to selectively apply/modify one or more countermeasures to a determined traffic class/category to prevent traffic from malicious devices from accessing the protected network 100.

It is to be understood and appreciated countermeasures are various defense mechanism's formatted to target and remove egregious attack traffic while permitting a network to continue operating wherein different countermeasures are designed to stop different types of attack traffic. Countermeasures are typically categorized as Raw and Event Driven countermeasures in which Raw countermeasures are preferably applied to each packet that transmits through a protection system 110. In contrast, Event Driven Countermeasures are not applied to each packet that transmits through a protection system 110. A protection system 110 preferably identifies the traffic stream with an application ID before an Event Driven countermeasure is applied wherein a protection system 110 may re-assemble a traffic stream (can be multiple packets) and notifies the appropriate countermeasure to inspect the traffic stream. A more detailed description of the protection and countermeasures offered by protection system 110 can be found in commonly assigned and co-pending U.S. patent application Ser. No. 13/869,691, the contents of which are hereby incorporated in their entity.

In FIG. 1 one or more external devices 125 attempt to connect to the protected network 100 and specifically a device 160 within the network 100. In the illustrated example, the external devices 125*a*, 125*b*, 125*c*, connect via the Internet 122, which is comprised of third-party communication devices (not shown), such as the communications devices of an enterprise network and/or other public and private service provider networks.

Connecting the protected network 100 to the internet 122 is a service provider network 123 (service provider). The service provider network has a service provider mitigating system that includes a packet scrubbing system such as a scrubbing center 116 and sensors, communication devices (not shown) which provide the data communication and specifically transmit packets across the ISP network 123. In the illustrated example, the service provider network 123 is an internet service provider (ISP) for the subscriber network 100. A more detailed description of an ISP network 123 can be found in commonly assigned U.S. patent application serial no. 2013/0055374.

The service provider network 123 further provides access to the scrubbing center 116. The scrubbing center 116 is a device (or group of devices) within or accessible from the service provider network 123 that is able to distinguish and then separate the legitimate traffic from attack traffic. The scrubbing center 116 receives off-ramped traffic through a communication channel, removes the detected attack traffic, the legitimate traffic is then returned through a communication channel. In some examples, the scrubbing center 116 removes or drops packets from specified source IP addresses, packets with specified source and specified destination IP addresses, packets with specified payloads, and/or packets for specified ports.

In the illustrated example, the scrubbing center 116 is connected to a router located at the peering edge of the service provider. However, the scrubbing center 116 is generally within the cloud and is capable of connecting to various communication devices of the service provider 123 in many implementations.

Generally, the management interface(s) for the edge detection device 110 resides inside the intranet or protected network 100. Any HTTP or HTTPS traffic initiated by the edge detection device 110 may use "proxy.example.com" to make connections from one of the management interfaces to the service provider 123. The service provider network 123 typically sees these connections as originating from the IP address of "proxy.example.com".

Also preferably connecting to the edge detection device 110 is a logical communication path 112. Packets transmitted over this communication path 112 are transmitted with the packets of the network connection 114 in this embodiment. In this way, the communications path 112 is in-band with the other communications between the protected network 100 and the service provider network 123. The communications path 112 transmits status messages that contain status information and reporting of ongoing mitigation between the upstream cloud mitigation system implemented in the service provider network 123.

In a typical implementation, the external server devices 125 (also referred to as external devices or host devices) attempt to connect to protected devices 160 within a protected network 100 typically via a private network or a public computer network such as the Internet 10, via an ISP network 123. Examples of external host devices include (but are not limited to) Internet Service Provider (ISP) servers, desktop computers, tablet devices, mobile phones, mobile computing devices, video games systems, televisions and other similar devices and systems having Internet connectivity. For purposes of description of certain illustrated embodiments of the present invention, host devices 125 are to be understood to consist of ISP servers 116 providing redundancy-scrubbing center functionality for one or more edge detection devices 110 in protected network 100.

In accordance with the illustrated embodiment of FIG. 1, the protected network 100 is protected by a data monitoring/protection system 110 preferably located between the Internet 122 and the protected network 100. Usually, the protected network 100 is an enterprise network, such as a school network, business network, and government network, to list a few examples. Protected network 100 may be coupled to a firewall device which couples to a Customer Edge (CE) router device 110.

In other embodiments, the protection system 110 may be located within the Internet, service provider network or enterprise network rather than as a network edge as illustrated. It is to be appreciated that when deployed within the protected network 100, traffic is diverted to the protection system 110.

In accordance with an aspect of the present invention, and as explained in more detail with reference to FIG. 2, in addition to providing the aforesaid protection features regarding a Denial of Service attack, protection device 110 is configured and operably to provide a redundancy server solution in which an edge detection device 110 is enabled to configure a plurality of redundant scrubbing centers 116 whereby for each configured scrubbing center 116, a signaling connection is maintained (as further described below). Each scrubbing center 116 sends and receives heartbeat protocol signals as if it were the only scrubbing center 116 connected to an edge detection device 110. A heartbeat protocol signal is a periodic signal generated by hardware or software to indicate normal operation or to synchronize two different computing components of a system. A heartbeat is intended to be used to indicate the health of a device. Usually a heartbeat is sent between devices at a regular interval on the order of seconds. If a heartbeat isn't received for a time (usually a few heartbeat intervals) the machine that should have sent the heartbeat is assumed to have failed.

The present invention enables an edge detection device 110 to parse a single heartbeat while discarding duplicate messages from each network connected scrubbing center 116. An advantage of the present invention is an edge detection device 110 is no longer required to initiate a handshake when subject to a Denial of Service attack (or other malicious actions), which may not be possible when subjected to such attacks. The present invention also significantly simplifies the need to sync redundant network connected scrubbing centers (e.g., 116a, 116b, . . . 116n) when new encryption keys are generated by each scrubbing center 116.

Figure 2:
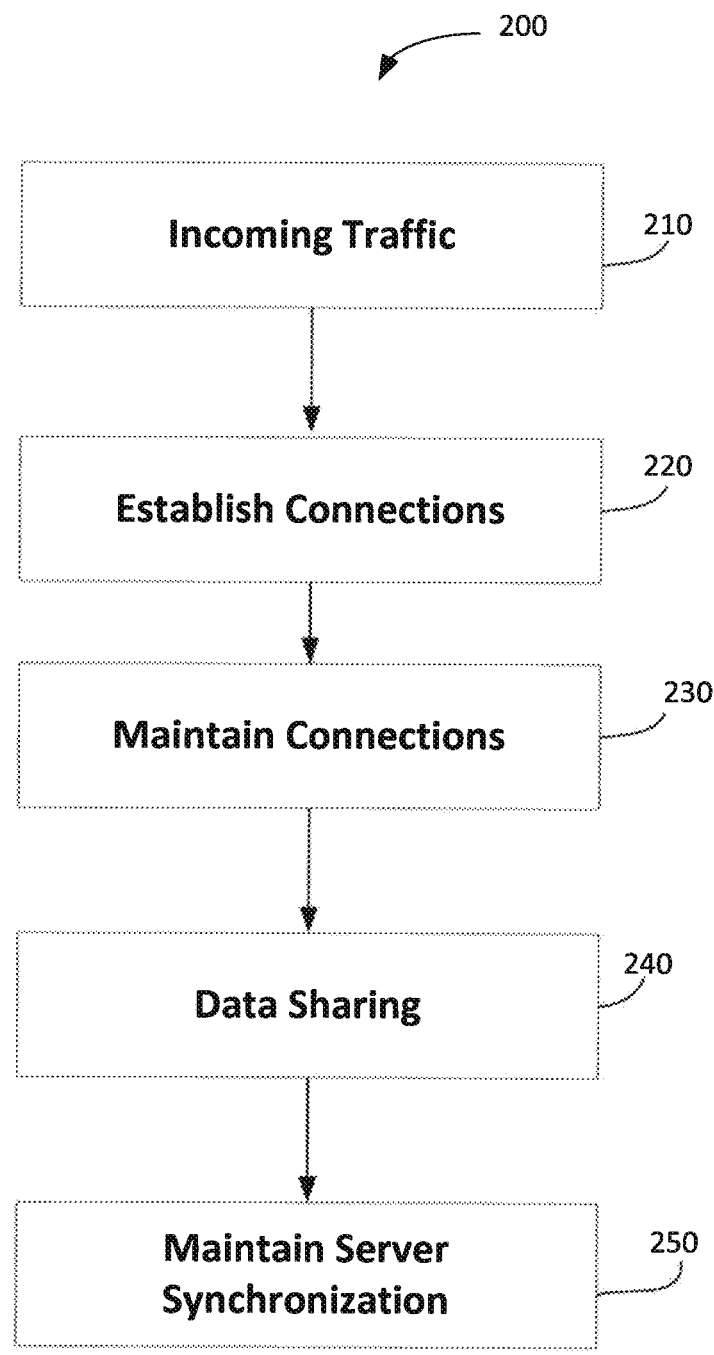
FIG. 2 is a flowchart illustrating a method in accordance with the illustrated embodiments.

FIG. 2 shows an illustrative method 200 for enabling data monitoring/protection system 110 to provide a redundancy data storage solution for the edge detection device 110 in which an edge detection device 110 is enabled to configure a plurality of redundant scrubbing centers 116 while providing protection against a DDoS attack through selective treatment of network traffic. It should be noted that throughout this description, it has been assumed that the system and method of the present invention uses a single provider edge router (PE) router to protect against a DDoS attack. However, it may be that there is a plurality of PE routers within the network that may functionally cooperate to perform the method of the present invention. For example, a network may include a plurality of PE routers and all of the PE routers are implemented within an exemplary network of the present invention.

The method begins with step 210 where traffic (e.g., a data packet) is received by the protection/traffic monitoring device 110. The traffic is then preferably analyzed by the traffic monitoring device 110 to determine if the traffic belongs to any one of a plurality of traffic/packet classifications whereby if the traffic is determined not to belong to one of a prescribed traffic/packet classifications, a prescribed set of countermeasures and policy is applied to the packet since such traffic is considered malicious traffic (e.g., associated with a Denial of Service attack). The traffic monitoring device 110 is then preferably configured to apply countermeasures which can include blacklisting the packet with regards to obtaining access to a protected device 160 in the protected network 100.

In accordance with an aspect of the present invention, the traffic monitoring device 110 is further configured and operable to establish a network connection with preferably more than one of a plurality of the aforesaid scrubbing centers 116, step 220. The traffic monitoring device 110 is then further adapted and configured to maintain each aforesaid network connection to each coupled scrubbing center 116, step 230. This maintained networked connection enables redundant server and retrieval functionality between the edge detection device 110 with each coupled scrubbing center 116, step 240.

Preferably utilizing heartbeat protocol signals, the traffic monitoring device 110 facilitates synchronization to each scrubbing center 116 to enable seamless redundant server functionality with each coupled scrubbing center 116, step 250. The traffic monitoring device 110 preferably enables each heartbeat protocol signal to be parsed so as to discard a duplicate message sent from each of the more than one of the plurality of scrubbing centers 116 to an edge detection device 110. As mentioned above, this is particularly advantageous in that an edge detection device 110 does not need to initiate a handshake with a new primary scrubbing center 116 when under attack (which may not be possible) (since a handshake is already established). Another noted advantage is the synching of all the redundant network connected scrubbing centers 116 when new encryption keys are generated by coupled scrubbing centers 116.

With the illustrative embodiments of the invention described above, it is to be appreciated the above presents a description of a best mode contemplated for carrying out the present invention and of the manner and process of making and using it in such full, clear, concise, and exact terms as to enable any person skilled in the art to which it pertains to make and use these devices and methods. The present invention is, however, susceptible to modifications and alternative method steps from those discussed above that are fully equivalent. Consequently, the present invention is not limited to the particular embodiments disclosed. On the contrary, the present invention encompasses all modifications and alternative constructions and methods coming within the spirit and scope of the present invention. The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. A system for providing redundancy with remote scrubbing center devices, comprising:
   one or more edge detection devices provided in a protected network;
   a plurality of scrubbing center devices provided in a telecommunications network for providing redundant scrubbing center functionality for one or more edge detection devices in the protected network; and
   a data traffic monitoring device for monitoring data traffic from the telecommunications network to the one or more client devices in the protected network, wherein the data traffic monitoring device is configured and operable to maintain a network connection with more than one of the plurality of scrubbing center devices such that data associated with at least one of the client devices is transmitted to each of the more than one of the plurality of scrubbing center devices whereby each of the more than one of the plurality of scrubbing center devices sends and receives a synchronization signal with each of the one or more edge detection devices.

2. The system as recited in claim 1, wherein each synchronization signal is a heartbeat protocol signal configured to negotiate and monitor the availability of a resource between a coupled server device and client device.

3. The system as recited in claim 2, wherein the data traffic monitoring device is further configured and operable to parse each heartbeat protocol signal so as to discard a duplicate message sent from each of the more than one of the plurality of server devices to scrubbing center.

4. The system as recited in claim 2, wherein the data traffic monitoring device is further configured and operable to detect malicious data sent from the telecommunications network to the one or more client devices in the protected network.

5. The system as recited in claim 4, wherein the data traffic monitoring device is configured and operable to detect a denial of service attack.

6. The system as recited in claim 4, wherein the data traffic monitoring device is further configured and operable to initiate one or more countermeasures against the detected malicious data.

7. The system as recited in claim 1, wherein the protected network is provided with a client edge (CE) router device.

8. The system as recited in claim 7, wherein the CE router device is coupled intermediate the data traffic monitoring device and the protected network.

9. The system as recited in claim 1, wherein the protected network is provided with a firewall device that controls network traffic in the protected network based upon a prescribed rule set.

10. An apparatus for providing redundancy of external server functionality with one or more edge detection devices provided with a plurality of scrubbing center devices provided in a telecommunications network, the apparatus comprising logic integrated with and/or executable by a processor, the logic being adapted to:
    monitor data traffic from the telecommunications network to the one or more client devices in the protected network;
    maintain a network connection with more than one of the plurality of scrubbing center devices such that data associated with at least one of the edge detection devices is distributed with each of the more than one of the plurality of scrubbing center devices; and
    enable each of the more than one of the plurality of scrubbing center devices to send and receive a synchronization signal with each of the one or more edge detection devices.

11. The apparatus as recited in claim 10, wherein each synchronization signal is a heartbeat protocol signal configured to monitor the availability of a resource between a coupled scrubbing center device and edge detection device.

12. The apparatus recited in claim 11, wherein the logic is further adapted to parse each heartbeat protocol signal so as to discard a duplicate message sent from each of the more than one of the plurality of scrubbing center devices to a edge detection device.

13. The apparatus as recited in claim 11, wherein the logic is further adapted to detect malicious data sent from the telecommunications network to the one or more client devices in the protected network.

14. The apparatus as recited in claim 13, wherein the logic is further adapted to detect a denial of service attack.

15. The apparatus as recited in claim 13, wherein the logic is further adapted to initiate one or more countermeasures against the detected malicious data.

16. An apparatus for providing redundancy of scrubbing center functionality with one or more edge detection devices in a protected network with a plurality of external scrubbing center devices provided in a telecommunications network, the apparatus comprising logic integrated with and/or executable by a processor, the logic being adapted to:
    monitor data traffic from the telecommunications network to the one or more client devices in the protected network;
    maintain a network connection with more than one of the plurality of external scrubbing center devices such that data associated with at least one of the edge detection devices is transmitted to each of the more than one of the plurality of scrubbing center devices;
    enable each of the more than one of the plurality of scrubbing center devices to send and receive a synchronization signal with each of the one or more edge detection devices; and
    detect a denial of service attack against the one or more client devices in the protected network.

17. The apparatus as recited in claim 16, wherein each synchronization signal is a heartbeat protocol signal configured to negotiate and monitor the availability of a resource between a coupled scrubbing center device and edge detection device.

18. The apparatus recited in claim 17, wherein the logic is further adapted to parse each heartbeat protocol signal so as to discard a duplicate message sent from each of the more than one of the plurality of server devices to a client device.

19. The apparatus as recited in claim 16, wherein the protected network is provided with a client edge (CE) router device.

* * * * *